United States Patent
Guzik et al.

[11] Patent Number: 6,015,970
[45] Date of Patent: Jan. 18, 2000

[54] SWITCH ASSEMBLY INCORPORATING OPTICAL CONTROL FUNCTION

[75] Inventors: Andrew T. Guzik, Pompano Beach; David L. Ellis, Coconut Creek; Rudy Yorio, Pompano Beach; Steven D. Pratt; Sivakumar Muthuswamy, both of Plantation, all of Fla.

[73] Assignee: Motorola, Inc., Schaumburg, Ill.

[21] Appl. No.: 08/988,922

[22] Filed: Dec. 11, 1997

[51] Int. Cl.[7] ...................................... G01D 5/34
[52] U.S. Cl. .................... 250/229; 250/214 PR; 250/214 SW; 200/61.27
[58] Field of Search .................. 250/214 PR, 214 P, 250/229, 214 SW; 356/303, 304, 305, 310, 374; 200/61.02, 61.27, 61.46

[56] References Cited

U.S. PATENT DOCUMENTS

| | | | |
|---|---|---|---|
| 3,416,865 | 12/1968 | Townsend | 250/214 PR |
| 3,859,617 | 1/1975 | Oka et al. | 250/214 PR |
| 4,103,155 | 7/1978 | Clark | 250/214 PR |
| 4,250,380 | 2/1981 | Iyeta | 250/214 PR |
| 4,320,293 | 3/1982 | Guretzky | 250/214 PR |
| 5,194,919 | 3/1993 | Katayama | 250/229 |
| 5,347,123 | 9/1994 | Jackson et al. | |
| 5,392,146 | 2/1995 | Jackson et al. | |
| 5,406,076 | 4/1995 | Mimura et al. | 250/229 |

*Primary Examiner*—Stephone Allen
*Attorney, Agent, or Firm*—Dale W. Dorinski

[57] ABSTRACT

An optical switch assembly for a two-way radio has electrical and mechanical subassemblies. The electrical portion consists an IR emitter (12) and a pair of IR receivers (14,16) strategically positioned upon a printed circuit board (10). The mechanical portion consists of a rotatable interposer mechanism (20) interconnected to a knob (35) on the radio via a shaft (28). The interposer has inner (22) and outer (24) concentric cylindrical walls. The outer wall controls the light transmitted between the emitter and one of the receivers (16), ultimately controlling the On-Off state of the radio. The inner wall has an integrated gray-scale graphic which controls the transmission of light between the emitter and the other IR receiver (14), ultimately controlling the audio output of the radio.

19 Claims, 4 Drawing Sheets

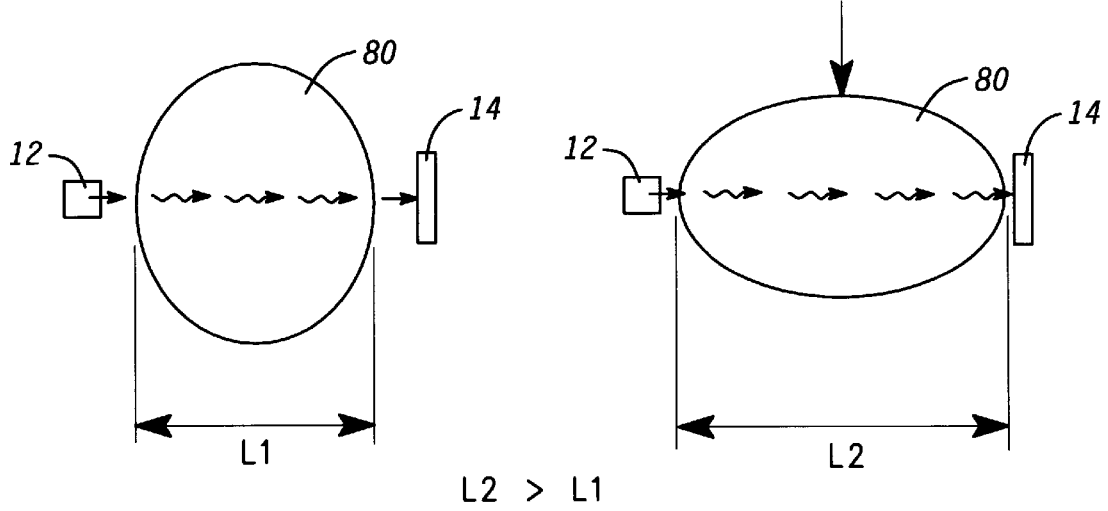
FIG. 8   FIG. 9

SWITCH ASSEMBLY INCORPORATING OPTICAL CONTROL FUNCTION

TECHNICAL FIELD

This invention relates in general to optical control devices and more specifically to an optically controlled On-Off switch having integrated volume control.

BACKGROUND

Radio frequency (RF) communication devices such as two-way radios typically have control mechanisms, e.g., On-Off and Volume Control switches, which enable the user of the communication device to change or vary operational parameters. Typically, these control mechanisms are electromechanical in nature—requiring independent physical interconnection between the control device and various electronic circuitry contained within the communication device. It is well known that such control devices have a number of undesirable characteristics. For instance, electromechanical switches have limited reliability due to contact wear and contamination, they do not lend themselves to automated factory assembly processes, and they are relatively expensive. Furthermore, poor synchronization between physical contact and tactile feedback during switch manipulation often detracts from device aesthetics. There is a constant effort by manufacturers of electronic devices such as portable two-way radios to develop improved optical switches. In addition to eliminating the aforementioned undesirable characteristics associated with electromechanical type controls, it would be desirable to integrate multiple device output controls, e.g., On-Off and Volume controls, in a non-electromechanical switch.

For the foregoing reasons, the need exists for an inexpensive, yet reliable, optical control switch which can be easily manufactured using low cost components and standard, low tolerance, manufacturing processes.

BRIEF DESCRIPTION OF THE DRAWINGS

FIG. 8 is a cross-sectional view of a deformable transparent interposer filled with a translucent medium, prior to the application of force to the interposer, in accordance with an alternate embodiment of the invention.

FIG. 9 is a cross-sectional view of a deformable transparent interposer filled with a translucent medium, with a force applied to the interposer, in accordance with an alternate embodiment of the invention.

DETAILED DESCRIPTION OF THE PREFERRED EMBODIMENT

Figure 2:
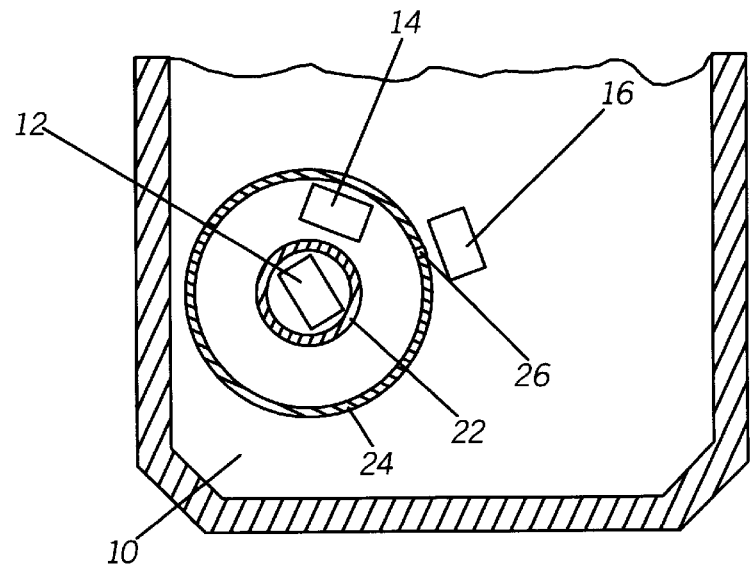
FIG. 2 is a top view through section 2—2 of the optically controlled electrical switch of FIG. 1.

While the specification concludes with claims defining the features of the invention that are regarded as novel, it is believed that the invention will be better understood from a consideration of the following description in conjunction with the drawing figures, in which like reference numerals are carried forward.

Figure 1:
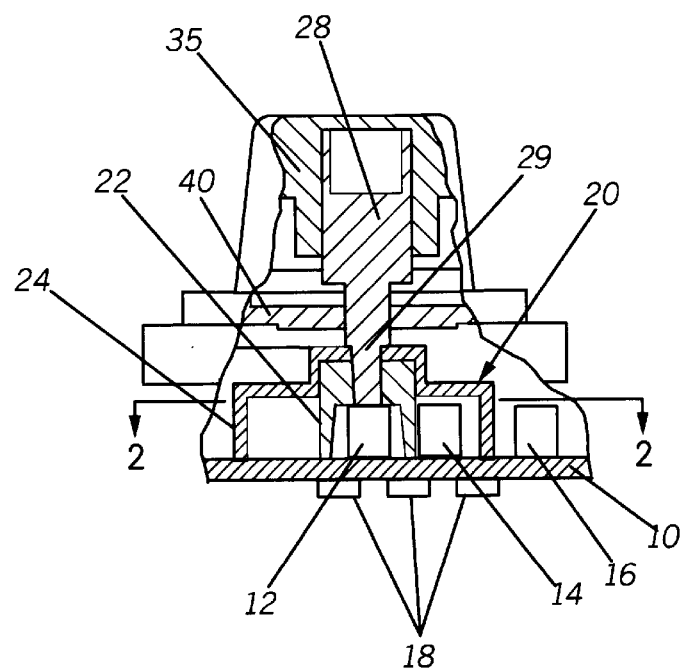
FIG. 1 is a partial section view of an optically controlled electrical switch, in accordance with the present invention.

Referring now to FIG. 1, a partial section view of an optically-controlled switch assembly for an electrical device is shown in accordance with our invention. In the preferred embodiment, the assembly is incorporated into a two-way radio and provides a means for simultaneously controlling the On-Off mode and audio output (or volume level) of the radio. Still, it will occur to one skilled in the art that the assembly could be used to control other operational parameters of the device. Electrical and mechanical subassemblies cooperate to form the entire assembly. In our preferred embodiment, the electrical and mechanical subassemblies are snap-fitted together.

Referring now to FIGS. 1 and 2, the electrical portion of the assembly consists of a light source 12 and a pair of light detectors 14, 16 mounted on the one major surface of a printed circuit substrate 10; the substrate is fixed within a device housing 40. In our preferred embodiment, the light source 12 consists of an infrared (IR) emitter (such as an LED), and the light detectors 14,16 consist of IR receivers (or phototransistors). Optionally, additional switch-supporting circuitry 18 may be disposed on the opposing major surface of the substrate. All three optical components 12,14,16 are strategically positioned such that the IR receivers 14,16 may be simultaneously illuminated by the IR emitter 12.

The mechanical portion of the assembly consists of a rotatable interposer mechanism 20 interconnected, by a shaft 28, to a knob 35 on the exterior of the device. Preferably, the interposer 20 comprises a unitary molded structure. The interposer has first and second (alternatively referred to as inner and outer) concentric cylindrical walls 22,24. In our preferred embodiment, the inner concentric wall 22 is translucent, allowing light to be transmitted from the IR emitter 12, through the first wall 22, toward both IR receivers 14,16. However, the inner wall 22 contains a gray-scale graphic which affects the amount of light passing from the IR emitter 12 through the wall 22, as the interposer 20 is rotated.

Light emanating from the light source has a first light intensity which, upon passing through the interposer is converted to a second light intensity. Although it is preferred that the interposer acts to reduce the first light intensity, the inventors contemplate applications in which the interposer may be used to effectively magnify or increase the first light intensity. As the interposer is rotated, the ability of light to pass therethrough—and thus the second light intensity—is correspondingly altered.

Figure 5:
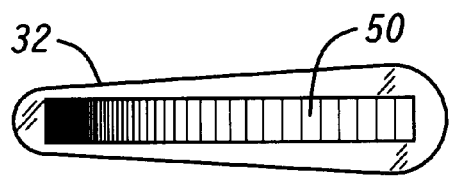
FIGS. 5–7 are exemplary illustrations of light-transmissive interposers.
Figure 6:
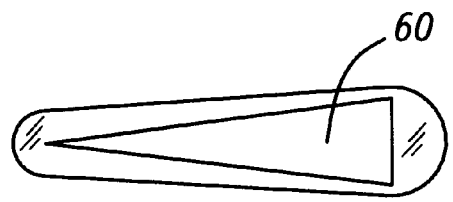
Figure 7:
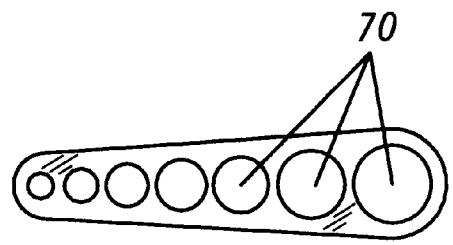

Referring now to FIGS. 5–7, various embodiments of light transmissive interposers are illustrated. Where light transmissive interposers are employed, the second light intensity is controlled by modulating, i.e., regulating, the passage of light through the interposer. In the preferred embodiment of the present invention, the interposer comprises a translucent plastic member having an integral gray scale graphic 50. The translucent plastic member may be manufactured using any of a number of commercially available materials such as polycarbonate and acrylic. The gray scale graphic may be physically molded into the member or may be attached by alternate means, e.g., adhesively, to an outer surface. Furthermore, the gray scale graphic does not necessarily comprise an independent component of the optical device. For example, the term "gray scale graphic" may connote a molded surface having an integral texture, progressively changing from smooth to rough, which modulates light intensity. In addition, the gray scale may employ a nonuniform distribution, e.g., logarithmic or sinusoidal, to produce special effects such as audio tapering. The quantity of light passing through the interposer is altered as the interposer is rotated; effecting a change in the detectable second light intensity. An alternate embodiment of the invention incorporates an opaque interposer having at least one opening, extending completely through the interposer, for modulating the second light intensity. Clearly, countless varieties of pattern openings may be envisioned. For example, in FIG. 6, an opaque member may incorporate a single tapered slot 60 extending completely through the disk. As the member is rotated, the change in opening size results in a corresponding change in the quantity of light passing therethrough. Alternatively, in FIG. 7, an opaque member may incorporate a plurality of circular openings 70 having different diameters.

Figure 3:
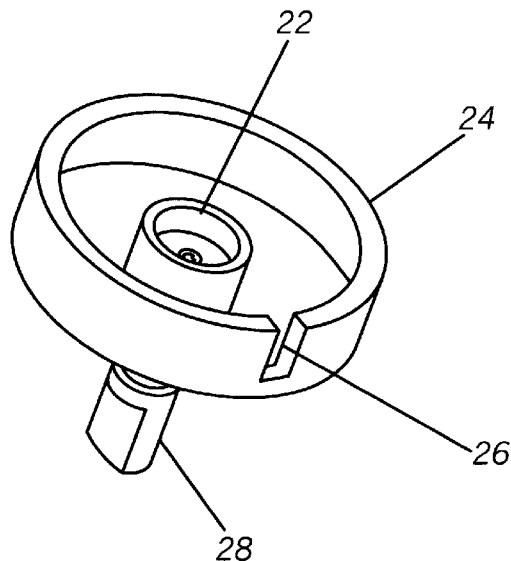
FIG. 3 is a perspective view of the underside of a rotary interposer mechanism for an optically controlled electrical switch, in accordance with the present invention.

Referring now to FIGS. 8 and 9 still another embodiment comprises a deformable interposer 80 disposed between a light source 12 and a light detector 14. The interposer comprises a transparent membrane filled with a translucent medium. Polyester films and polyethylene sheets are just two examples of commercially available transparent membranes. The translucent medium, which may comprise a liquid or a gel, attenuates light as it travels from the light source 12 to the light detector 14. The magnitude of the light attenuation is proportional to the distance that the light must travel through the translucent medium. As the distance the light must travel is increased, from L1 to L2, the corresponding intensity of light received at the light detector is decreased. Thus, the light has a first light intensity, upon leaving the light source 12, which is decreased to a second light intensity upon reaching the light detector 14. The light detector has a variable electric output which corresponds to the second light intensity. A means for controlling the deformation of the interposer is necessary to control the second light intensity. One skilled in the art will recognize that the means available is virtually limitless, though it is contemplated that most will involve applying a force, F, to an outer surface of the transparent membrane of the interposer 80. Varying force, F, results in a corresponding variation in travel distance L2, rendering the second light intensity, and thus the electrical output of the light detector, controllable. The outer wall 24 is opaque, preventing the transmission of light therethrough. The means used to render the outer wall opaque is not critical, and numerous ways will occur to one skilled in the art. For example, in addition to molding the outer wall using an opaque plastic, the second wall could be molded from a translucent plastic and subsequently covered with a non-translucent material. The outer wall has an opening 26 formed therethrough (see FIG. 3).

Still referring to FIGS. 1 and 2, the following discussion is intended to clarify the operation of our novel optical switch assembly. When the radio is in the 'Off' mode (i.e., turned off), the outer wall opening 26 is positioned directly in front of the second IR receiver 16. In this initial state, light emitted from the IR emitter 12 travels through both the inner wall 22 and the opening 26 in the outer wall 24 for receipt by the second IR receiver 16. As long as light is received by the second IR receiver, the radio remains in the Off state. The interposer 22 is rotated by manipulation of the knob 35 located on the exterior of the radio. The knob is attached to the first end (or top) of the shaft 28. The second end 29 of the shaft is attached directly to the interposer mechanism 20. It will occur to one skilled in the art that there numerous methods available to attach the shaft to the interposer. For example, the shaft second end 29 could be mated with an aperture optionally formed in the top of the interposer 20. Rotation of the knob 35 results in identical rotation of the inner and outer concentric cylindrical walls 22,24. Thus, initial rotation of the interposer positions the opening 26 in the second wall 24 away from the second IR receiver 16, turning the device on. Further rotation of the knob alters (e.g., increases) the audio output level of the device, by effecting a change in the intensity of light received at the first IR receiver 14. More specifically, as the first wall 22 is rotated, the gray scale graphic, which is either attached or integrated into the wall, alters the amount of light transmitted through the wall along a linear path between the IR emitter 12 and the first IR receiver 14.

Figure 4:
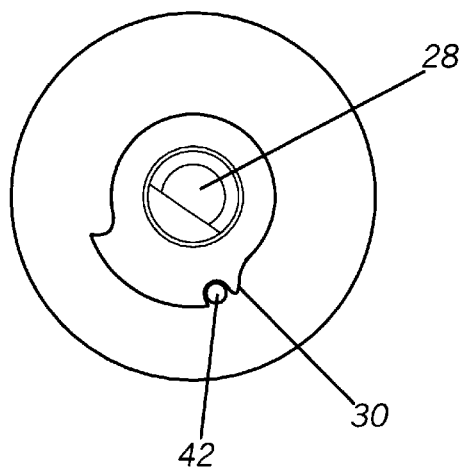
FIG. 4 is a top view of the rotary interposer mechanism of FIG. 3.

Referring now to FIG. 4, another embodiment of the invention incorporates a cam feature 30 integrated into the top portion of the interposer 22. The cam feature cooperates with, e.g., a spring loaded follower mechanism 42 to provide tactile feedback to a device user. The outer wall opening 26 and the cam are geometrically positioned in such a way that the user senses a good synchronization between the tactile feedback and the electrical switching function of the device. When the interposer is rotated via the knob 35 from its initial (Off) state until a "click" is heard, the radio is turned to its On state.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, similar functionality could be achieved using a single light detector. In such a case, an interposer having a single translucent cylindrical wall positioned between the light source and detector would be used. Here, a gray-scale graphic integrated into the wall could have, e.g., an opaque region positioned between the light source and detector (with the radio in the Off state) with subsequent rotation of the interposer varying light transmission through the wall to control audio output.

What is claimed is:

1. A switch assembly for an electrical device, comprising:
   a printed circuit substrate having a first major surface;
   first and second light detectors mounted upon the first major surface of said printed circuit substrate;
   a light source mounted upon the first major surface of said printed circuit substrate; and
   a rotatable interposer mechanism having first and second concentric cylindrical walls, the walls having first and second respective diameters, the first wall being translucent to IR light and having a light transmission control means for adjusting the intensity of light transmitted therethrough, the second wall being opaque and having an opening formed therethrough, wherein
   light emitted from the light source is transmitted through the opening in the opaque second wall to the second light detector only when said electrical device is in an OFF mode, light emitted from the source is transmitted only to the first light detector when said electrical device is in an ON mode, and the intensity of light received by the first light detector is adjustable via said light transmission control means.

2. A switch assembly as described in claim 1, wherein said light source further comprises an infrared (IR) emitter.

3. A switch assembly as described in claim 1, wherein said light detectors further comprise infrared (IR) receivers.

4. A switch assembly as described in claim 1, further comprising an interposer shaft for rotatably controlling said interposer mechanism.

5. A switch assembly as described in claim 1, wherein said light transmission control means further comprises a gray scale graphic.

6. A switch assembly as described in claim 1, wherein the diameter of the opaque second wall is greater than the diameter of the first wall.

7. A switch assembly as described in claim 1, wherein the diameter of the opaque second wall is less than the diameter of the first wall.

8. A switch assembly as described in claim 1, wherein the first light detector controls electrical device audio output.

9. A switch assembly as described in claim 1, further comprising an integral cam feature formed on said interposer mechanism.

10. A switch assembly as described in claim 1, wherein said electrical device is a two-way radio.

11. A switch assembly for a two-way radio, the radio having a housing, the switch assembly comprising:
   a printed circuit substrate having first and second opposing major surfaces and fixed within said device housing;
   a light source and first and second light detectors disposed upon the first major surface of said printed circuit substrate; and
   a rotatable interposer mechanism having upper and lower portions,
      the lower portion having inner and outer concentric cylindrical walls, the inner wall disposed between the light source and the first light detector and having a gray scale graphic for controlling the intensity of light transmitted therethrough, the outer wall disposed between the first and second light detectors, the outer wall further being opaque and having an opening formed therethrough,
      the upper portion attached to a second end of a shaft, and a first end of the shaft exposed through an opening in the radio housing and having a control knob attached thereto for rotating the shaft.

12. A switch assembly as described in claim 11, wherein said light source further comprises an infrared (IR) emitter.

13. A switch assembly as described in claim 11, wherein said light detectors further comprise infrared (IR) receivers.

14. A switch assembly as described in claim 11, wherein said control knob controls both the ON/OFF mode and audio output of the radio.

15. A switch assembly as described in claim 11, further comprising switch support circuitry disposed upon the second major surface of said printed circuit substrate.

16. A switch assembly as described in claim 11, wherein the upper portion of said interposer mechanism has an integral cam feature for providing tactile feedback to an operator of said radio.

17. A switch assembly as described in claim 11, wherein said gray scale graphic is fixed to an external surface of the inner wall.

18. A switch assembly as described in claim 11, wherein said gray scale graphic is integrated into the inner wall of said interposer.

19. A two-way radio, comprising:
   a switch assembly, comprising:
      a printed circuit substrate having first and second opposing major surfaces;
      an infrared (IR) emitter and first and second IR receivers disposed upon the first major surface; and
      a rotatable interposer mechanism having upper and lower portions,
         the lower portion having inner and outer concentric cylindrical walls, the inner wall situated between the IR emitter and the first IR receiver and having an integral gray scale graphic for controlling the transmission of light therethrough, the outer wall situated between the first and second IR receivers, the outer wall further being opaque and having an opening formed therethrough,
         the upper portion having an aperture for receiving a shaft, the shaft having first and second ends, the second end mating with the aperture, the first end exposed through an opening in the radio housing and having a control knob attached thereto for rotating the interposer mechanism via the shaft.

* * * * *